(12) United States Patent
Rojit et al.

(10) Patent No.: US 9,197,892 B2
(45) Date of Patent: *Nov. 24, 2015

(54) OPTIMIZED MOTION COMPENSATION AND MOTION ESTIMATION FOR VIDEO CODING

(71) Applicant: Freescale Semiconductor, Inc., Austin, TX (US)

(72) Inventors: Jacob Rojit, Sunnyvale, CA (US); Alexander Naum Kipnis, Mountain View, CA (US); Behzad R. Sayyah, Emerald Hills, CA (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 322 days.

This patent is subject to a terminal disclaimer.

(21) Appl. No.: 13/782,925

(22) Filed: Mar. 1, 2013

(65) Prior Publication Data

US 2013/0195191 A1    Aug. 1, 2013

Related U.S. Application Data

(63) Continuation of application No. 12/572,151, filed on Oct. 1, 2009, now Pat. No. 8,411,749.

(60) Provisional application No. 61/103,511, filed on Oct. 7, 2008.

(51) Int. Cl.
*H04N 7/12* (2006.01)
*H01H 67/02* (2006.01)
*H04N 19/583* (2014.01)
*H04N 19/51* (2014.01)
*H04N 19/433* (2014.01)

(52) U.S. Cl.
CPC ....... *H04N 19/00733* (2013.01); *H04N 19/433* (2014.11); *H04N 19/51* (2014.11)

(58) Field of Classification Search
USPC .......................... 375/240.01–240.29; 335/132
See application file for complete search history.

(56) References Cited

U.S. PATENT DOCUMENTS 5,576,676 A * 11/1996 Koller et al. .................. 335/132
2006/0056514 A1 * 3/2006 Simpson et al. ......... 375/240.16

\* cited by examiner

*Primary Examiner* — Gims Philippe

(57) ABSTRACT

A system (and a method) are disclosed for intelligently fetch one or multiple reference blocks from memory for each block to be motion compensated or motion estimated within a video processing system. The system includes a reference block configuration evaluation unit and a motion compensation memory fetching unit. The reference block configuration evaluation unit analyzes the reference block configuration of the block being motion compensated with a plurality of reference block configurations of its neighboring blocks. In response to a reference block configuration evaluation result, the reference block configuration evaluation unit decides the configuration of reference blocks to be fetched from a memory. The motion vector memory fetching unit fetches the number of reference blocks for motion compensation accordingly.

18 Claims, 5 Drawing Sheets

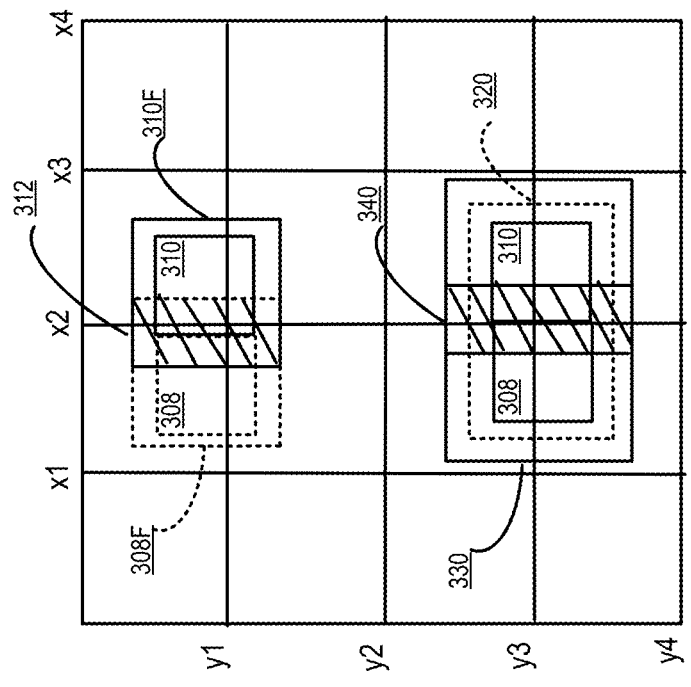
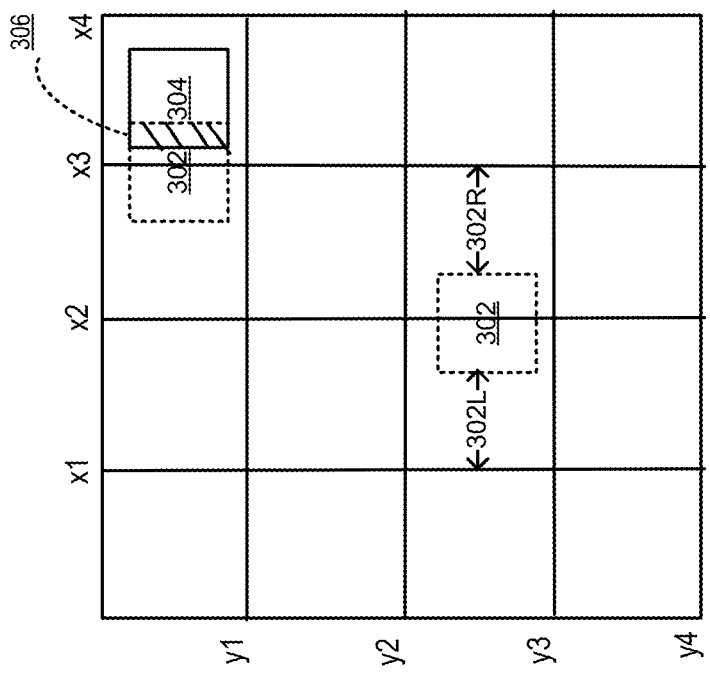
FIG. 3B
FIG. 3A

OPTIMIZED MOTION COMPENSATION AND MOTION ESTIMATION FOR VIDEO CODING

CROSS-REFERENCE TO RELATED APPLICATIONS

This application is a continuation of U.S. application Ser. No. 12/572,151, filed Oct. 1, 2009, which claims priority under 35 U.S.C. §119(e) to U.S. Provisional Patent Application No. 61/103,511, filed on Oct. 7, 2008, entitled "Optimized Motion Compensation For Video Coding," all of which are incorporated by reference in their entirety.

BACKGROUND

1. Field of Art

The disclosure generally relates to video processing, and more particularly, to optimize memory access of motion compensation and motion estimation within a video processing system.

2. Description of the Related Art

Motion compensation is often an important consideration for high video compression performance within a video processing system. For example, many existing video coding standards use a block-based hybrid motion compensated and transform video coding method. In a hybrid motion compensated and transform video coder, inter-picture motion compensated prediction reduces temporal redundancies between successive video pictures (or frames). Each block within a current picture, which is a B-type or P-type picture, is normally predicted by the encoder of the motion-compensated video coder from a previous picture(s) which can be an I-type, a P-type, or a B-type picture. Motion compensated prediction also reduces spatial redundancies within a picture. For example, H.264 video coding standard uses intra-picture motion-compensated prediction to reduce spatial redundancies within an I-type picture itself. Each current block of the I-type picture is predicted by reference block(s) found within the same picture.

A motion vector, MV (x, y), obtained by motion compensated prediction shows the spatial difference between a current block in the current picture and a reference block in the reference picture(s). A motion vector is a translation vector, indicating motion of a reference block in the reference picture(s) aligning with the predicted block. The prediction errors from motion compensated prediction indicate the content difference between the current and reference block. With motion vector and prediction errors being decoded at the decoder of the video coder, the decoder performs the motion compensation to reconstruct the current block. Specifically, the decoder copies the content of the best matched block from the reference picture indicated by the motion vector of the current block and adds the prediction errors to the best matched block to reconstruct the current block. As such, motion-compensated prediction can greatly improve video compression compared to the coding without such processing.

To copy the content of the reference block for motion compensation of a single block, a decoder needs to fetch the content from a computer memory, such as DRAM. Recently emerging video coding standards require support for variable block-size motion compensation with small block sizes, and their implementation requires a heavier use of memory. For example, the H.264 video coding standard supports more flexibility in the selection of motion compensation block sizes and shapes than any previous standards, with a luma motion compensation block size as small as 4×4 pixels. Compared with 4 motion vectors per macroblock of 16×16 pixels required by earlier standards, the H.264 standard supports as many as 16 independent motion vectors for the same 16×16 pixels macroblock. This higher motion vector flexibility results in a larger number of memory fetches where each fetch comprises fewer reference pixels. In the case of H.264, each row fetched from memory may consist of as few as 4 pixels useful for motion compensation.

Complicating the memory requirement for motion compensation due to smaller and variable block sizes, memory read location of the reference block for a block being motion compensated often does not align perfectly with the block size of the block being motion compensated. For example, a 4×4 pixels reference block may sit between two neighboring memory read units, each of which is 8×64 pixels in size. For horizontal direction alone, a non-aligned memory reads fetch pixels unused next to the reference block on both left and right sides along memory grid. Such complication translates to more motion compensation related memory bandwidth waste.

FIG. 3A is a block diagram first illustrating memory bandwidth waste due to unaligned memory fetch related to motion compensation of a single block. FIG. 3A includes a memory consisting of a plurality of memory units. Each memory unit is defined by its two-dimensional coordinates, i.e., $x_i$ and $y_i$. In one embodiment, the $x_i$ is in unit of 8 pixels and $y_i$ in 64 pixels. In this case, a memory fetch unit is 8×64 pixels. Block 302 is a reference block identified by the decoded motion vector and reference information of a current block being motion compensated. The location of the reference block does not always align perfectly with memory unit configuration in a memory. Thus, a non-aligned memory read fetches unused pixels on both sides of the reference block. Taking block 302 in FIG. 3A as an example, the memory read of block 302, which locates between the memory unit $(x_2, y_3)$ and memory unit $(x_3, y_3)$, needs to fetch both memory unit $(x_2, y_3)$ and the memory unit $(x_3, y_3)$ to reconstruct the block being motion compensated. However, due to the non-alignment described above, the pixels (i.e., 302L) between the left boundary of memory unit $(x_2, y_3)$ and the block 302 are unused, thus wasted. Similarly, the pixels (i.e., 302R) between the right boundary of the memory unit $(x_3, y_3)$ and the block 302 are wasted. Thus, just horizontally alone, the memory fetch of the reference block 302 wastes (302L+302R) pixels due to non-alignment memory read.

Another example of memory bandwidth waste related to the memory fetch of a motion vector reference block is from overlapping of pixels between multiple reference blocks. Very often multiple motion vectors for multiple blocks to be motion compensated may point to the same memory location for the reference blocks. Memory bandwidth waste related to the memory fetch of motion vector reference block may arise from the overlapping of pixels between multiple reference blocks.

FIG. 2 illustrates a simplified motion compensation of multiple neighboring blocks which have same or similar motions. For example, in FIG. 2, a moving football in the current picture 200 is located in two neighboring blocks, block 222 and its right neighboring block 224. The moving football is a rigid moving object whose motion spreads over multiple blocks. Therefore, the motion prediction process at the encoder side of a video coder finds that, within the search range 250, the corresponding motion vectors 230 and 240 for the blocks 222 and 224 are same with each other in terms of amount of motion and direction of motion. Conventional memory fetch of motion compensation for blocks 222 and 224 requires two separate memory fetches: one for reference block 222R identified by motion vector 230 and one for reference block 224R identified by motion vector 240. However, one memory fetch for reference blocks 222R and 224R may be saved because blocks 222R and 224R have same motion information needed for the motion compensation of blocks 222 and 224, and can be fetched together with one memory fetch.

Referring back to FIG. 3A, FIG. 3A also illustrates the memory bandwidth waste due to overlapping of multiple reference blocks in motion compensation. In top right corner of FIG. 3A, the decoded motion vectors for two blocks being motion compensated identifies their corresponding reference blocks 302 and 304 in the memory. Two reference blocks 302 and 304 have some overlapping pixels between the two reference blocks, e.g., pixels in an overlapping block 306, due to similar motions. To fetch reference block 302 for its corresponding block being motion compensated will fetch the overlapping pixels 306 once. A separate memory fetch of reference block 304 will fetch the overlapping pixels 306 twice. As such, the overlapping pixels 306 are unnecessarily fetched twice for motion compensation.

Additional memory bandwidth waste related to motion compensation comes from more accurate motion compensation requirements in recently emerging coding standards. For example, MPEG-2 standard supports half-pixel motion vector accuracy, while H.264 supports quarter-pixel-accurate motion compensation, which allows a motion vector points to a reference location between pixels in quarter pixel granularity. In such cases, e.g., half-pixel or quarter-pixel granularity, neighboring pixels can be interpolated by variable tap sub-pixel filter, such as widely used 6-tap sub-pixel filter, to form prediction pixels. However, when a sub-pixel filter is used for more accurate motion compensation, a larger block needs to be fetched for a reference block. For example, using a 6-tap sub-pixel filter for a 16×16 pixels macroblock, a block of size 21×21 pixels needs to be fetched for the motion compensation. For a memory unit often having a size of $2^n$ (where n is an positive integer number), a 21×21 pixels memory read translates to a memory fetch of at least 32×32 pixels memory content, thus, resulting in fetching 768 bytes of data, instead of the 441 bytes of data needed. The memory bandwidth waste gets worse for motion compensating a 4×4 block because a 9×9 reference block must be fetched from memory, requiring a 16×12 fetch of 192 bytes of data instead of 81 bytes of data needed.

FIG. 3B (top center) first illustrates the memory bandwidth waste due to sub-pixel filtering support requirement. Two reference blocks 308 and 310 in the memory are to be fetched separately for their corresponding blocks to be motion compensated. Due to the sub-pixel accuracy motion compensation requirement, a larger block for each reference block, i.e., 308F for 308 and 310F for 310 reference block, needs to be fetched from the memory. The larger blocks, e.g., 308F and 310F, are referred to as sub-pixel accuracy motion compensation support block from herein in the specification. The size of a sub-pixel accuracy motion compensation support block is determined by the type of sub-pixel interpolation filter being used. The overlapping block 312 between the two larger blocks, 308F and 310F, represents the pixels that are unnecessarily fetched twice from the memory for the motion compensation process. For example, assuming the reference blocks 308 and 310 each is a 16×16 pixels macroblock, using a 6-tap sub-pixel filter for blocks 308 and 310 needs to fetch 308F and 310F each of size 21×21 pixels for the motion compensation. The overlapping 312 is at least 5 pixels in horizontal direction, which are fetched twice unnecessarily.

Motion vector refinement often occurs after a video transcoder finishes the decoding of the motion vector information, and prepares for encoding the decoded video stream into the required destination video format. Often the video transcoder needs to refine a decoded motion vector by searching the neighboring pixels of the reference block identified by the motion vector. As such, for two neighboring reference blocks, the overlapping between the motion vector refinement blocks represents the memory bandwidth waste due to motion vector refinement support.

FIG. 3B (bottom center) also illustrates the memory bandwidth waste due to motion vector refinement support described above. In FIG. 3B, two reference blocks 308 and 310 need motion vector refinement process. The dotted region 320 around the two reference blocks represents the block for sub-pixel filtering support and the solid area 330 represents the block for motion vector refinement support. The solid region 330 is referred to as motion vector refinement support block from herein in the specification. The size of a motion vector refinement support block is determined by a configurable threshold, which is a design choice of implementation. The overlapping block 340 between two motion vector refinement support blocks represents the pixels would be wasted from separate memory fetch of the motion vector refinement support blocks.

Motion estimation involves searching a region within a reference picture for a close match of the current block in a current picture. Referring to FIG. 5A, to estimate the motion of the block 601, the complete search range and the region of support, represented by 601S, need to be fetched from the memory. The fetched block 601S may overlap with another block's search range and region of support as shown in FIG. 5B, represented by the shaded region 603. In the FIG. 5B, 602 represents the other block and 602S represents the search range and region of support of 602. Conventionally, the regions 601S and 602S would have been fetched separately, resulting in fetching the overlap region 603 twice. This results in memory bandwidth degradation, or it requires the memory to have much higher bandwidth requirement. Such overlapping memory fetches are unnecessary and can be done by fetching the region 601S first and then fetching region 602S minus the overlap region of 603. As an example, in the case of searching for a block of 4×4, a search range and the region of support of 18×18 are required. For a cluster of 4×4 in a 16×16 block, the total search range and region of support for all the 4×4s put together will result in fetching 5184 bytes. However if an intelligent memory fetch is carried out, the total bytes that is required to be fetched from the memory comes out to be 900 bytes, which is significantly smaller than 5184 bytes. This improves the overall memory efficiency as the bandwidth requirements drops significantly.

The combination of smaller and variable reference block sizes, non-aligned memory read, overlapping reference blocks and motion compensation with sub-pixel accuracy results in a large amount of memory bandwidth waste related to motion compensation. In case of transcoding, further motion compensation related memory waste may arise when an encoder needs to refine a decoded motion vector or fetch overlapping search range and the region of support. Thus, there is lacking, inter alia, a system and method for optimized memory access of motion compensation in a video processing system.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3A is a block diagram illustrating memory bandwidth waste due to unaligned memory fetch and overlapping of multiple reference blocks.

FIG. 3B is a block diagram illustrating memory waste due to sub-pixel filtering and motion vector refinement support.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of the what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system (and method) includes optimizing memory access of motion compensation by reducing memory waste bandwidth related to the motion compensation. Embodiments of the motion compensation memory access optimization include a motion vector evaluation unit and a motion compensation memory fetching unit. For a current block being motion compensated, the motion vector evaluation unit analyzes the motion vector of the current block together with a plurality of motion vectors of its neighboring blocks. Based on the evaluation of the similarity among the plurality of motion vectors, the evaluation unit decides the number of reference blocks to be fetched from memory. The motion compensation memory fetching unit fetches a single or multiple reference blocks from the memory accordingly, so that the memory bandwidth waste related to the motion compensation is reduced.

Architectural Overview

Figure 1:
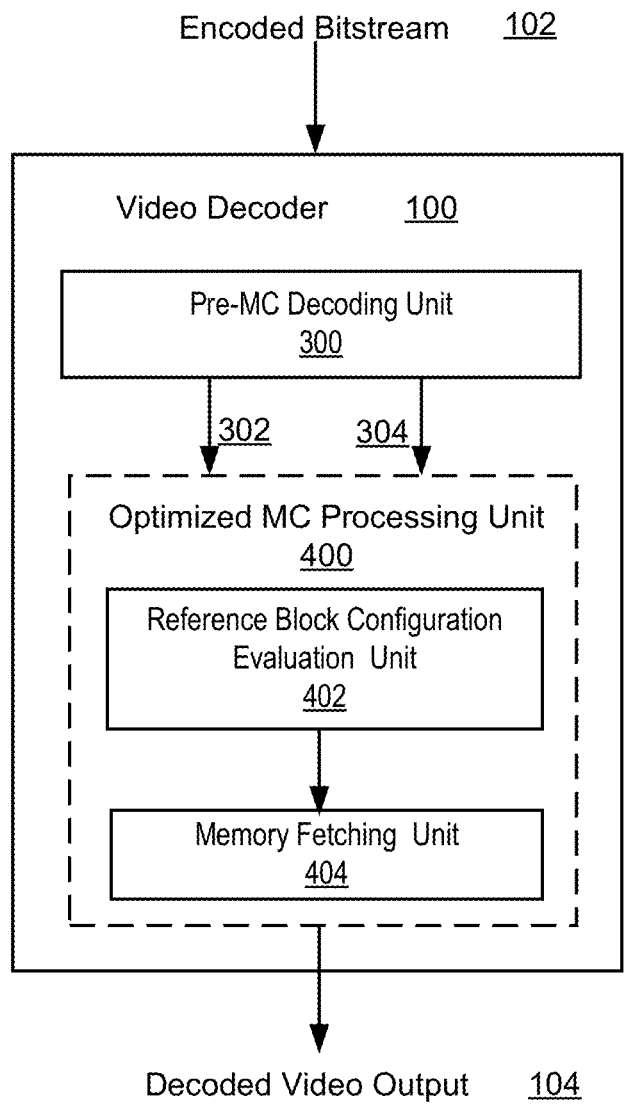
FIG. 1 is a high-level block diagram of a video decoder having an optimized motion compensation processing unit according to one embodiment.

FIG. 1 is a high-level block diagram of a video decoder 100 having an optimized motion compensation (MC) processing unit 400 according to one embodiment. The video decoder 100 includes a pre-MC processing unit 300 and an optimized MC processing unit 400. The pre-MC processing unit 300 may include conventional processing units such as variable length entropy decoder for decoding motion vectors, inverse quantizer for decoding quantized Discrete Cosine Transform (DCT) coefficients of prediction errors, inverse DCT and/or other decoding units. The video decoder 100 receives an encoded bitstream 102 from its corresponding encoder, processes it by the pre-MC decoding unit 300 and optimized MC processing unit 400, and produces a decoded video output 104.

In one embodiment, the pre-MC decoding unit 300 processes the encoded bitstream 102. Specifically, the pre-MC decoding unit 300 extracts motion vector information from the encoded bitstream 102 for each block to be motion compensated and sends it to a variable length entropy decoder for decoding. The decoding result 302 by the variable length entropy decoder is a decoded motion vector and the reference block information including memory address of the reference block for the block to be motion compensated. The inverse quantizer of the pre-MC decoding unit 300 performs inverse quantization on the quantized prediction errors for each block to be motion compensated. The inverse DCT is then conducted on the inverse quantized prediction errors to reconstruct the prediction errors for the block to be motion compensated. The result 304 is the reconstructed motion-compensated prediction errors for the block to be motion compensated.

The optimized MC processing unit 400 receives the motion vector information including motion vector information, reference block information and decoded prediction errors for each block to be motion compensated. In one embodiment, the optimized MC processing unit 400 includes a reference block configuration evaluation unit 402 to evaluate received motion vectors. The result of the evaluation unit 402 is a number of reference blocks to be fetched collectively. The memory fetching unit 404 launches a series of memory read commands to copy the content of the reference block(s) from memory for motion compensation. Other embodiments of the optimized MC processing unit 400 may include a picture buffer to store decoded reference pictures for the motion compensation processing.

Optimized Memory Access for Motion Compensation

To efficiently reduce memory bandwidth waste related to motion compensation process, memory access to reference blocks of the blocks to be motion compensated needs to be optimized. The optimized motion compensation processing unit 400 reduces memory bandwidth waste by intelligently fetching multiple reference blocks. Specifically, the optimized motion compensation processing unit 400 fetches those reference blocks that have same or similar motion vectors among neighboring blocks of the current block being motion compensated. Prior to memory access to the reference block of the current block, the optimized motion compensation processing unit 400 analyzes a plurality of motion vectors associated with the neighboring blocks of the current block and determine the number of reference blocks to be fetched collectively.

Referring back to FIG. 1, the optimized motion compensation processing unit 400 processes the received motion vectors in picture unit, i.e., picture by picture. For a current block of a picture being motion compensated, a plurality of motion vectors of its neighboring blocks are evaluated together with the current block by the reference block configuration evaluation unit 402. In one embodiment, the evaluation unit 402 just evaluates the motion vector of the left neighboring block of the current block. Other embodiments may evaluate more than two neighboring blocks of the current block, such as the left, top left, top and top right neighboring blocks.

Figure 2:
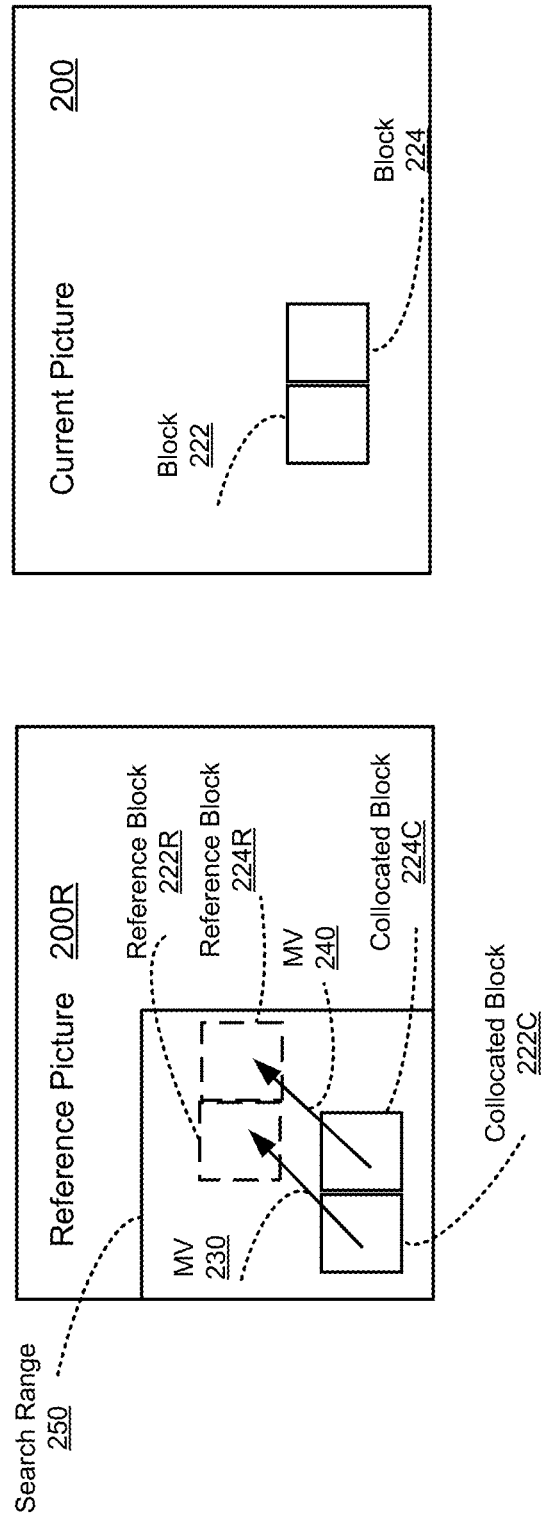
FIG. 2 is a block diagram illustrating conventional inter-picture motion compensation for multiple neighboring blocks.

Taking the evaluation of two neighboring blocks, such as block 222 and 224 in FIG. 2, as an example, in one embodiment, the evaluation unit 402 evaluates whether the motion vectors 230 and 240 of the blocks 222 and 224, respectively, are equal. Assuming motion vectors 230 and 240 are described by MV ($x_1$, $y_1$), and MV ($x_2$, $y_2$), respectively. In response to both motion vectors being equal, i.e., $x_1$ being same as $x_2$ and $y_1$ being same as $y_2$, the evaluation unit 402 marks the corresponding reference blocks 222R and 224R to be fetched together.

In other embodiments, the evaluation unit 402 evaluates whether the motion vectors 230, 240 are similar. In one embodiment, the evaluation unit 402 evaluates whether the motion vector 240 of the current block 224 is within a fixed or configurable delta range of motion vector 230 of its left neighboring block 222. The delta range indicates how similar the two motion vectors being evaluated are. For example, the fixed delta range in one embodiment is plus or minus of 2 pixels, that is, $x_2 \leq x_1+2$ or $x_2 \leq x_1-2$; similarly, $y_2 \leq y_1+2$ or $y_2 \leq y_1-2$. In response to motion vector MV ($x_2$, $y_2$) is within the delta range of MV ($x_1$, $y_1$), the evaluation unit 402 marks the corresponding reference blocks 222R and 224R to be fetched together.

In yet another embodiment, the evaluation unit 402 evaluates the amount of difference between the motion vector of the current block and the motion vector of its neighboring block with respect to the overlapping region between the reference blocks of the current block and its neighboring block in the memory. Referring back to FIG. 3A, assuming the motion vector of the current block is MV ($x_4$, $y_4$), and its reference block is 304; its neighboring block has a motion vector MV ($x_3$, $y_3$) and its reference block is 302. In this case, the evaluation unit 402 evaluates whether the difference between the motion vector MV ($x_4$, $y_4$) and the motion vector MV ($x_3$, $y_3$) is at least equal to the number of pixels of the overlapping region 306 between the reference blocks 302 and 304. In one embodiment, the amount of difference between the MV ($x_4$, $y_4$) and MV ($x_3$, $y_3$) is the sum of the absolute differences between MV ($x_4$, $y_4$) and MV ($x_3$, $y_3$) horizontally and vertically, e.g., $|x_4-x_3|+|y_4-y_3|$. If the evaluation result indicates it does, the evaluation unit 402 marks the corresponding reference blocks 302 and 304 to be fetched together.

In case of supporting sub-pixel accurate motion compensation, the evaluation unit 402 evaluates the amount of difference between the motion vector of the current block and the motion vector of its neighboring block with respect to the overlapping region between the sub-pixel filtering support blocks of the current block and its neighboring block in the memory. For example, in FIG. 3B, the sup-pixel filtering support blocks for the current block and its neighboring block are 310F and 308F, respectively. The overlapping region between 310F and 308F is represented by the block 312. The evaluation unit 402 evaluates the amount of the difference between the motion vector of the current block and its neighboring block is at least equal to the number of pixels of the block 312. If the evaluation result indicates it does, the evaluation unit 402 marks the corresponding reference blocks 308 and 310 to be fetched together.

In case of supporting motion vector refinement for a video transcoder, the evaluation unit 402 evaluates the amount of difference between the motion vector of the current block and the motion vector of its neighboring block with respect to the overlapping region between the motion vector refinement support blocks of the current block and its neighboring block in the memory. Referring to FIG. 3B, the evaluation unit 402 evaluates whether the difference between the motion vector of the current block and the motion vector of its neighboring block is at least equal to the number of pixel of the overlapping block 340. If the evaluation result indicates it does, the evaluation unit 402 marks the corresponding reference blocks 308 and 310 to be fetched together.

To further reduce memory bandwidth waste due to the combination of smaller and variable reference block sizes, non-aligned memory read, overlapping reference blocks and motion compensation with sub-pixel accuracy, a more comprehensive and a more complex evaluation may be performed by the evaluation unit 402. For example, in one embodiment, the evaluation unit 402 may compare the amount of data of multiple reference blocks to be fetched from the memory against the amount of data of fetching a single reference block. In addition to consider the similarity among multiple motion vectors, the evaluation unit 402 may also consider other factors that affect the memory access optimization, such as fetch latency, available memory bandwidth, processing power, and associated processing delay. The evaluation unit 402 makes a decision such that the memory access related to motion compensation is most efficiently optimized.

The memory fetching unit 404 receives the number of reference blocks to be fetched collectively and copies the content of the reference block(s) for the motion compensation. The optimized MC processing unit 400 adds the prediction errors to the content of the reference block, reconstructs the current block, and outputs the reconstructed current block 104. In one embodiment, the memory fetching unit 404 performs standard memory read and write commands which are known to those of ordinary skills in the art.

Figure 4:
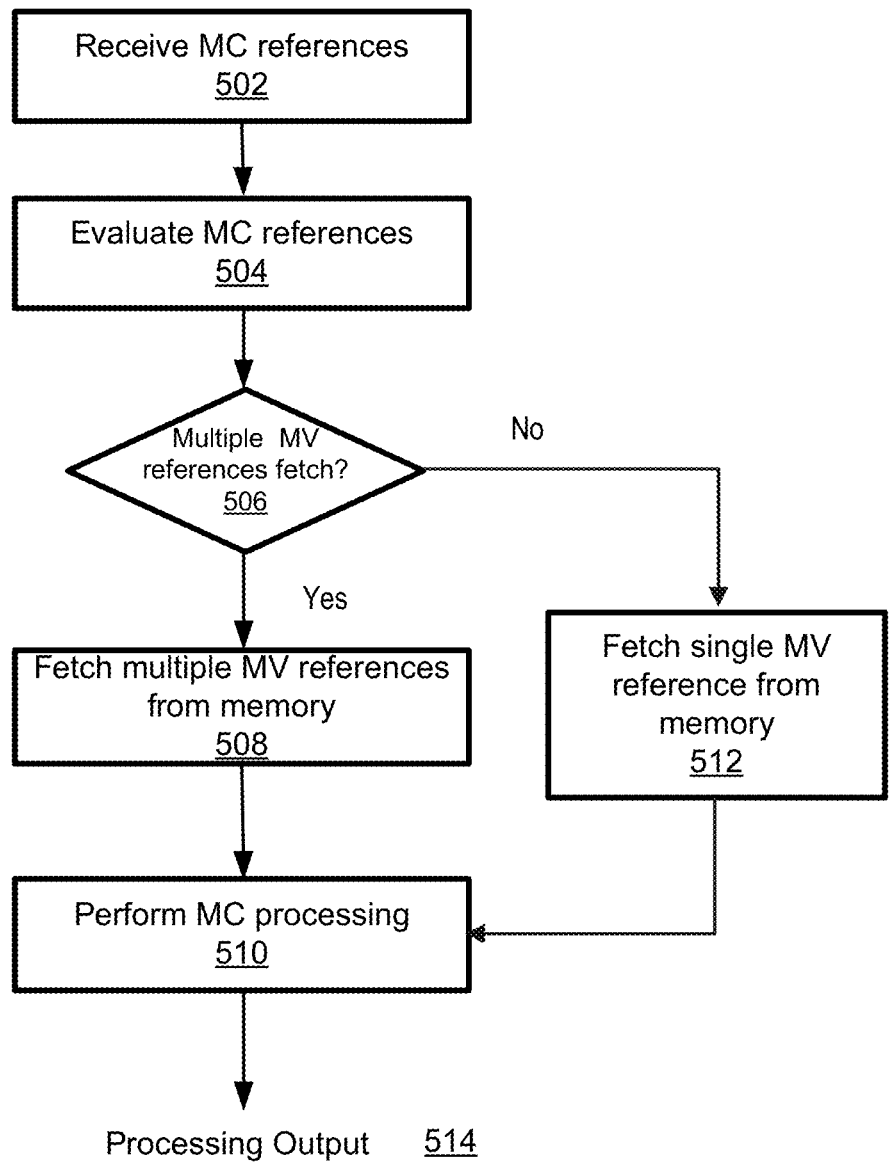
FIG. 4 is a flow chart of motion compensation with optimized memory access according to one embodiment.
Figure 5A:
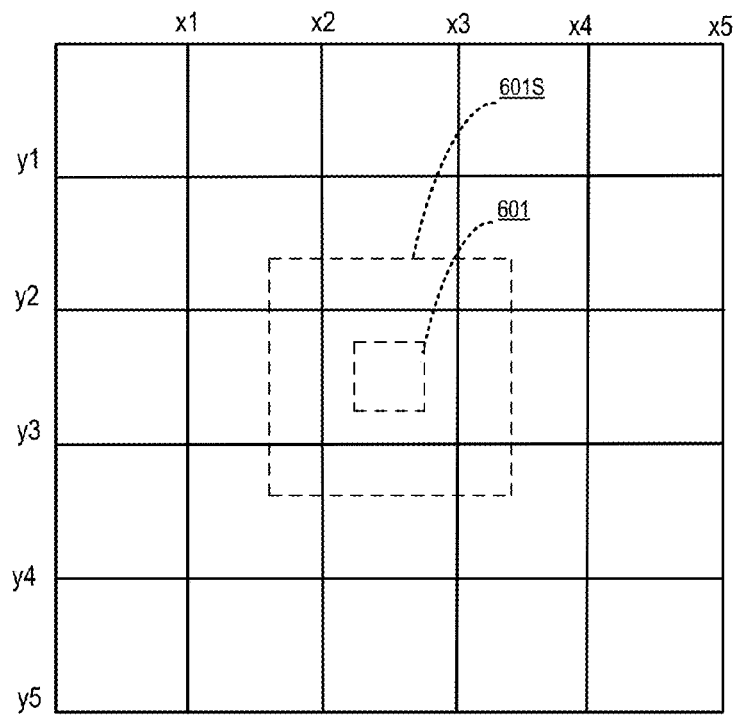
FIG. 5A is a block diagram illustrating a block in a reference picture surrounded by its search range and region of support.
Figure 5B:
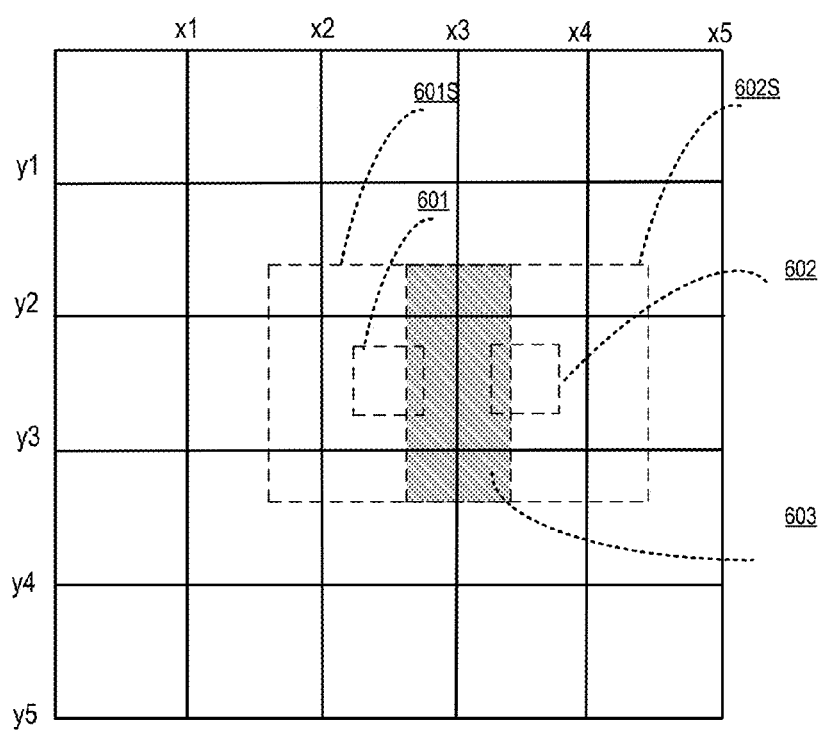
FIG. 5B is a block diagram illustrating memory bandwidth waste due to overlapping of multiple search ranges and region of supports.

FIG. 4 is a flow chart of motion compensation with optimized memory access according to one embodiment. Initially, the optimized motion compensation processing unit 400 receives 502 a plurality of motion compensation references and each reference may include at least a motion vector of the current block being motion compensated, and reference block information including memory address of the reference block associated with the current block. The evaluation unit 402 evaluates 504 the received motion vectors of the current block and its neighboring blocks. In response to motion vectors of neighboring blocks being same or similar, the evaluation unit 402 indicates 506 the number of reference blocks to be fetched collectively. If a single reference block needs to be fetched, the motion compensation memory fetching unit 404 fetches 512 the single reference block needed and passes the result to the optimized motion compensation processing unit 400 for further processing 510. In response to multiple reference blocks to be fetched, the motion compensation memory fetching unit 404 fetches 508 the multiple reference blocks needed and passes the result to the optimized motion compensation processing unit 400 for further processing 510. The processing unit 400 reconstructs the current block and output the processing output 514.

The disclosed embodiments beneficially allow for a system and method that optimizes the memory access related to motion compensation process. The embodiments analyze the decoded motion vectors of neighboring blocks of a current block being motion compensated by a reference block configuration evaluation unit 402. Neighboring blocks having same or similar motion vectors most likely have closely related reference blocks corresponding to the similarity of the motion vectors. Rather than separately fetching the reference block for each block being motion compensated, the optimized motion compensation processing unit 400 collectively fetches multiple neighboring blocks in response to motion vectors evaluation result. As such, one memory fetch of multiple reference blocks will benefit multiple related blocks being motion compensated. Consequently, the memory bandwidth waste due to the combination of smaller and variable reference block sizes, non-aligned memory read, overlapping reference blocks and motion compensation with sub-pixel accuracy can be efficiently reduced.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations (e.g. the processes described above), while described functionally, computationally, or logically, are understood to be implemented by computer programs or equivalent electrical circuits, microcode, or the like. The computer programs are typically embedded as instructions that can be stored on a computer readable memory (e.g. flash drive disk, or memory) and are executable by a processor. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and method that optimizes the memory access related to motion compensation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for memory access of motion compensation for a block of video data, comprising:
    receiving a plurality of motion compensation references, a motion compensation reference including a motion vector of a reference block and a memory address of the reference block, the reference block associated with the block of video data being motion compensated;
    comparing a first motion vector of a reference block of the block being motion compensated with a second motion vector of a reference block of a neighboring block of the block being motion compensated, wherein the comparing comprises:
        determining whether a difference between the first motion vector and the second motion vector is at least equal to a number of pixels of an overlapping region between the reference blocks; and
    fetching a number of reference blocks from a memory collectively based on the comparison of the motion vectors of the corresponding reference blocks of the plurality of motion compensation references.

2. The method of claim 1, further comprising:
    responsive to the difference between the first motion vector and the second motion vector being at least equal to the number of pixels of the overlapping region between the reference blocks, fetching the reference block of the block being motion compensated and the reference block of the neighboring block of the block being motion compensated together.

3. The method of claim 2, wherein
    the first motion vector is similar to the second motion vector.

4. The method of claim 2, further comprising:
    determining a first absolute difference between the first motion vector and the second motion vector in a horizontal direction;
    determining a second absolute difference between the first motion vector and the second motion vector in a vertical direction, wherein the difference between the first and second motion vectors comprises a sum of the first and second absolute differences; and
    responsive to the difference being at least equal to the number of pixels of the overlapping region, fetching the reference block of the block being motion compensated and the reference block of the neighboring block of the block being motion compensated together.

5. The method of claim 2, wherein
    the first motion vector is identical to the second motion vector.

6. The method of claim 1, wherein the reference blocks comprise a sub-pixel accuracy motion compensation support block of the block being motion compensated and a sub-pixel accuracy motion compensation support block of the neighboring block, the dimensions of sub-pixel accuracy motion compensation support blocks being determined by a sub-pixel accuracy pixel interpolation filter.

7. The method of claim 1, wherein the reference blocks comprise a motion vector refinement support block of the block being motion compensated and a motion vector refinement support block of the neighboring block, the dimensions of motion vector refinement support blocks being determined by a configurable threshold.

8. A system for optimizing memory access of motion compensation for a block of video data, comprising:
a receiving module for receiving a plurality of motion compensation references, a motion compensation reference including a motion vector of a reference block and a memory address of the reference block, the reference block associated with the block of video data being motion compensated;
a reference block configuration evaluation unit for comparing a first motion vector of a reference block of the block being motion compensated with a second motion vector of a reference block of a neighboring block of the block being motion compensated, wherein the reference block configuration evaluation unit is further for:
determining whether a difference between the first motion vector and the second motion vector is at least equal to a number of pixels of an overlapping region between the reference blocks; and
a motion compensation memory fetching unit for fetching a number of reference blocks from a memory collectively based on the comparison of the motion vectors of the corresponding reference blocks of the plurality of motion compensation references.

9. The system of claim 8, wherein the reference block configuration evaluation unit is further for:
responsive to the difference between the first motion vector and the second motion vector being at least equal to the number of pixels of the overlapping region between the reference blocks, fetching the reference block of the block being motion compensated and the reference block of the neighboring block of the block being motion compensated together.

10. The system of claim 9, wherein
the first motion vector is similar to the second motion vector.

11. The system of claim 9, wherein the reference block configuration evaluation unit is further for:
determining a first absolute difference between the first motion vector and the second motion vector in a horizontal direction;
determining a second absolute difference between the first motion vector and the second motion vector in a vertical direction, wherein the difference between the first and second motion vectors comprises a sum of the first and second absolute differences; and
responsive to the difference being at least equal to the number of pixels of the overlapping region, fetching the reference block of the block being motion compensated and the reference block of the neighboring block of the block being motion compensated together.

12. The system of claim 9, wherein
the first motion vector is identical to the second motion vector.

13. The system of claim 8, wherein the reference blocks comprise a sub-pixel accuracy motion compensation support block of the block being motion compensated and a sub-pixel accuracy motion compensation support block of the neighboring block, the dimensions of sub-pixel accuracy motion compensation support blocks being determined by a sub-pixel accuracy pixel interpolation filter.

14. The system of claim 8, wherein the reference blocks comprise a motion vector refinement support block of the block being motion compensated and a motion vector refinement support block of the neighboring block, the dimensions of motion vector refinement support blocks being determined by a configurable threshold.

15. A non-transitory computer-readable medium containing computer program code for optimizing memory access of motion compensation for a block of video data, the computer program code comprising code for:
receiving a plurality of motion compensation references, a motion compensation reference including a motion vector of a reference block and a memory address of the reference block, the reference block associated with the block of video data being motion compensated;
comparing a first motion vector of a reference block of the block being motion compensated with a second motion vector of a reference block of a neighboring block of the block being motion compensated, wherein the comparing comprises:
determining whether a difference between the first motion vector and the second motion vector is at least equal to a number of pixels of an overlapping region between the reference blocks; and
fetching a number of reference blocks from a memory collectively based on the comparison of the motion vectors of the corresponding reference blocks of the plurality of motion compensation references.

16. The computer-readable medium of claim 15, further comprising computer program code for:
responsive to the difference between the first motion vector and the motion vector being at least equal to the number of pixels of the overlapping region between the reference blocks, fetching the reference block of the block being motion compensated and the reference block of the neighboring block of the block being motion compensated together.

17. The computer-readable medium of claim 16, wherein
the first motion vector is similar to the second motion vector.

18. The computer-readable medium of claim 16, further comprising computer program code for:
determining a first absolute difference between the first motion vector and the second motion vector in a horizontal direction;
determining a second absolute difference between the first motion vector and the second motion vector in a vertical direction, wherein the difference between the first and second motion vectors comprises a sum of the first and second absolute differences; and
responsive to the difference being at least equal to the number of pixels of the overlapping region, fetching the reference block of the block being motion compensated and the reference block of the neighboring block of the block being motion compensated together.

* * * * *